United States Patent
Su et al.

(10) Patent No.: US 9,868,219 B1
(45) Date of Patent: Jan. 16, 2018

(54) SELF-ADJUSTING ROBOT CLAMPING JAW FOR GRABBING HUB

(71) Applicant: CITIC Dicastal CO., LTD., Qinhuangdao (CN)

(72) Inventors: Jinbao Su, Qinhuangdao (CN);
Hongtao Wang, Qinhuangdao (CN);
Zhiwei Qin, Qinhuangdao (CN);
Huanming Ma, Qinhuangdao (CN);
Zhiliang Zhang, Qinhuangdao (CN);
Zaide Wang, Qinhuangdao (CN);
Yingfeng Wang, Qinhuangdao (CN);
Yongwang Zhao, Qinhuangdao (CN)

(73) Assignee: CITIC DICASTAL CO., LTD (CN)

( * ) Notice: Subject to any disclaimer, the term of this patent is extended or adjusted under 35 U.S.C. 154(b) by 0 days.

(21) Appl. No.: 15/594,546

(22) Filed: May 12, 2017

(30) Foreign Application Priority Data

Feb. 25, 2017 (CN) .......................... 2017 1 0105136

(51) Int. Cl.
*B25J 15/02* (2006.01)
*B25J 15/00* (2006.01)
*B25J 15/10* (2006.01)

(52) U.S. Cl.
CPC ......... *B25J 15/0028* (2013.01); *B25J 15/106* (2013.01)

(58) Field of Classification Search
CPC ....... B25J 15/0028; B25J 15/00; B25J 15/106
USPC .................. 294/207, 119.1, 86.4; 414/751.1; 901/31, 39
See application file for complete search history.

(56) References Cited

U.S. PATENT DOCUMENTS

| | | | | |
|---|---|---|---|---|
| 4,194,853 A * | 3/1980 | Barth | ...................... | E01C 19/52 404/73 |
| 4,261,609 A * | 4/1981 | Kraszewski | ........... | B22D 29/04 294/119.1 |
| 4,750,132 A * | 6/1988 | Pessina | .................. | B65G 47/90 212/286 |
| 4,911,098 A * | 3/1990 | Tabata | ................... | G01N 1/312 118/423 |
| 5,221,118 A * | 6/1993 | Koltookian | .............. | B25J 15/00 294/119.4 |
| 5,947,539 A * | 9/1999 | Long | .................... | B25J 15/0028 294/119.1 |
| 8,172,292 B1 * | 5/2012 | Andersen | ............. | B25J 11/0045 294/2 |
| 2008/0164382 A1 * | 7/2008 | Burlot | .................. | B25J 19/0025 248/74.2 |
| 2011/0215602 A1 * | 9/2011 | Shirasaki | .................... | B25J 1/00 294/119.1 |
| 2013/0020820 A1 * | 1/2013 | Bieler | .................... | B25J 15/026 294/119.1 |
| 2014/0042761 A1 * | 2/2014 | Li | ........................ | B25J 15/0028 294/207 |

(Continued)

*Primary Examiner* — Paul T Chin
(74) *Attorney, Agent, or Firm* — Kwan & Olynick LLP

(57) ABSTRACT

A self-adjusting robot clamping jaw for clamping a hub on a hub coating line to complete transfer can realize certain self-adjustment via rotation of an upper connecting plate around a rotating pin in the clamping process when the wear extents of clamping fingers are inconsistent, and can prevent the phenomena that the hub is clamped obliquely and even a hub brace is bent by lateral force. The clamping fingers made of a soft material can prevent damaging the surface coating and can be convenient to replace.

7 Claims, 3 Drawing Sheets

(56) References Cited

U.S. PATENT DOCUMENTS

2014/0239655 A1* 8/2014 Murakami ............ B25J 15/026
  294/119.1
2015/0246445 A1* 9/2015 Kennerknecht ...... B25J 15/0061
  294/207

* cited by examiner

SELF-ADJUSTING ROBOT CLAMPING JAW FOR GRABBING HUB

RELATED APPLICATION

This application claims priority to Chinese Patent Application No. 201710105136.2, filed on Feb. 25, 2017, which is hereby incorporated by reference in its entirety.

TECHNICAL FIELD

The present disclosure more specifically relates to a self-adjusting robot clamping jaw for grabbing a hub, and generally relates to the field of hub production equipment.

BACKGROUND

At present, with continuous popularization and improvement of automation level of manufacturing enterprises, manual carrying has been gradually substituted with robot carrying for the carrying operation in the hub production process, and the transfer operation between a ground chain and another ground chain, a roller bed and the like in a coating line of a hub has been increasingly widely applied. The robot transfers the hub generally in such a manner that the clamping jaw clamps the rim. However, the conventional clamping jaw has two shortages in the clamping operation: firstly, in order to prolong the service life of the clamping jaw, the clamping fingers of the clamping jaw are generally made of a hard wear-resistant material, causing certain damage to the surface coating of the hub; and secondly, when the wear extents of the clamping fingers on two sides of the clamping jaw are inconsistent, the hub may be clamped obliquely and even the hub brace is bent by lateral force.

SUMMARY

Aiming at the above shortcomings of the prior art, the present disclosure provides a self-adjusting robot clamping jaw for grabbing a hub.

The technical solution for solving the technical problems adopted in the present disclosure is that a self-adjusting robot clamping jaw for grabbing a hub includes connecting plates and clamping fingers installed symmetrically on two sides of the connecting plates. The connecting plates include an upper connecting plate and a lower connecting plate, sections of which are both rectangular. Pin holes are correspondingly provided in the middle parts of the upper and lower connecting plates, a rotating pin penetrates through the pin holes, and a clamping ring is arranged at the lower end of the rotating pin to fit the upper and lower connecting plates together. Strip through holes are formed symmetrically on two sides of the upper plane of the upper connecting plate, the lower connecting plate is provided with mounting holes corresponding to the strip through holes, and the mounting holes are used to install the clamping jaw onto a clamping jaw movable support. The clamping finger includes a clamping finger rod, a clamping finger stall and a clamping finger head, the lower end of the clamping finger stall is fixed to the end of the clamping finger rod, the clamping finger head is embedded into the clamping finger stall in an interference fit manner, and the clamping finger is installed onto the upper connecting plate via an adjustable device.

Further, a reset device is provided between the upper and lower connecting plates.

Further, the lower end of the clamping finger stall is welded to the end of the clamping finger rod.

Further, the adjustable device between the clamping finger and the upper connecting plate is configured in such a manner that a plurality of rectangular through holes are provided symmetrically on the left and right sides of the front vertical face of the upper connecting plate, the clamping finger rods are matched with the rectangular through holes and inserted into the rectangular through holes at symmetrical positions, a pin hole is provided above each rectangular through hole, all the clamping finger rods are correspondingly provided with a plurality of pin holes, one of the pin holes at the same part of the two clamping fingers is aligned with the pin hole above the rectangular through hole of the upper connecting plate, and an additional positioning pin is inserted into the aligned pin holes for fixing.

Further, the clamping finger heads are made of a soft material.

Preferably, the clamping finger heads are made of polyurethane.

Further, two supporting rods at the lower end of the clamping jaw movable support penetrate through the strip through holes of the upper connecting plate and are installed to the lower connecting plate, the upper end of the movable support is connected with the end of a piston rod of a cylinder, the tail end of the cylinder body of the cylinder is installed to a robot connecting seat, and sliding rods are arranged on the robot connecting seat and penetrate through sliding holes at the upper end of the movable support.

The self-adjusting robot clamping jaw of the present disclosure for clamping a hub on a hub coating line to complete transfer can realize certain self-adjustment via rotation of the upper connecting plate around the rotating pin in the clamping process when the wear extents of the clamping fingers are inconsistent, and can prevent the phenomena that the hub is clamped obliquely and even the hub brace is bent by lateral force.

In which: 101—rotating pin, 102—positioning pin, 103, strip through hole, 104—pin hole, 105—upper connecting plate, 106—rectangular through hole, 107—clamping finger rod, 108—clamping finger head, 109—clamping finger stall, 110—pin hole, 111—pin hole, 112—clamping ring, 113—lower connecting plate, 114—mounting hole, 115—pin hole, 1—clamping jaw, 2—sliding rod, 3—robot connecting seat, 4—cylinder, 5—movable support.

DETAILED DESCRIPTION OF THE EMBODIMENTS

The present disclosure will be further described in detail below in combination with embodiments and the accompanying drawings.

Figure 1:
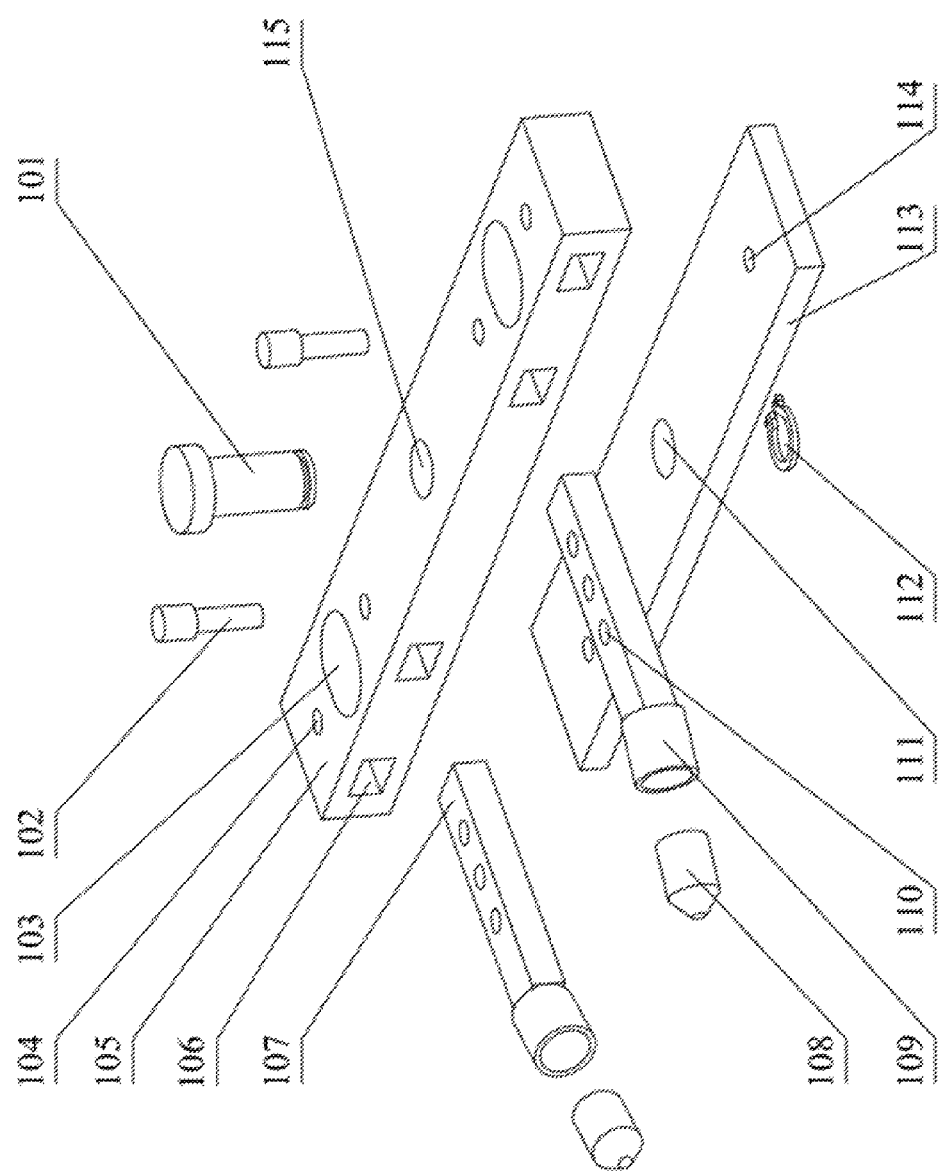
FIG. 1 is a three-dimensional schematic diagram of the present disclosure.
Figure 2:
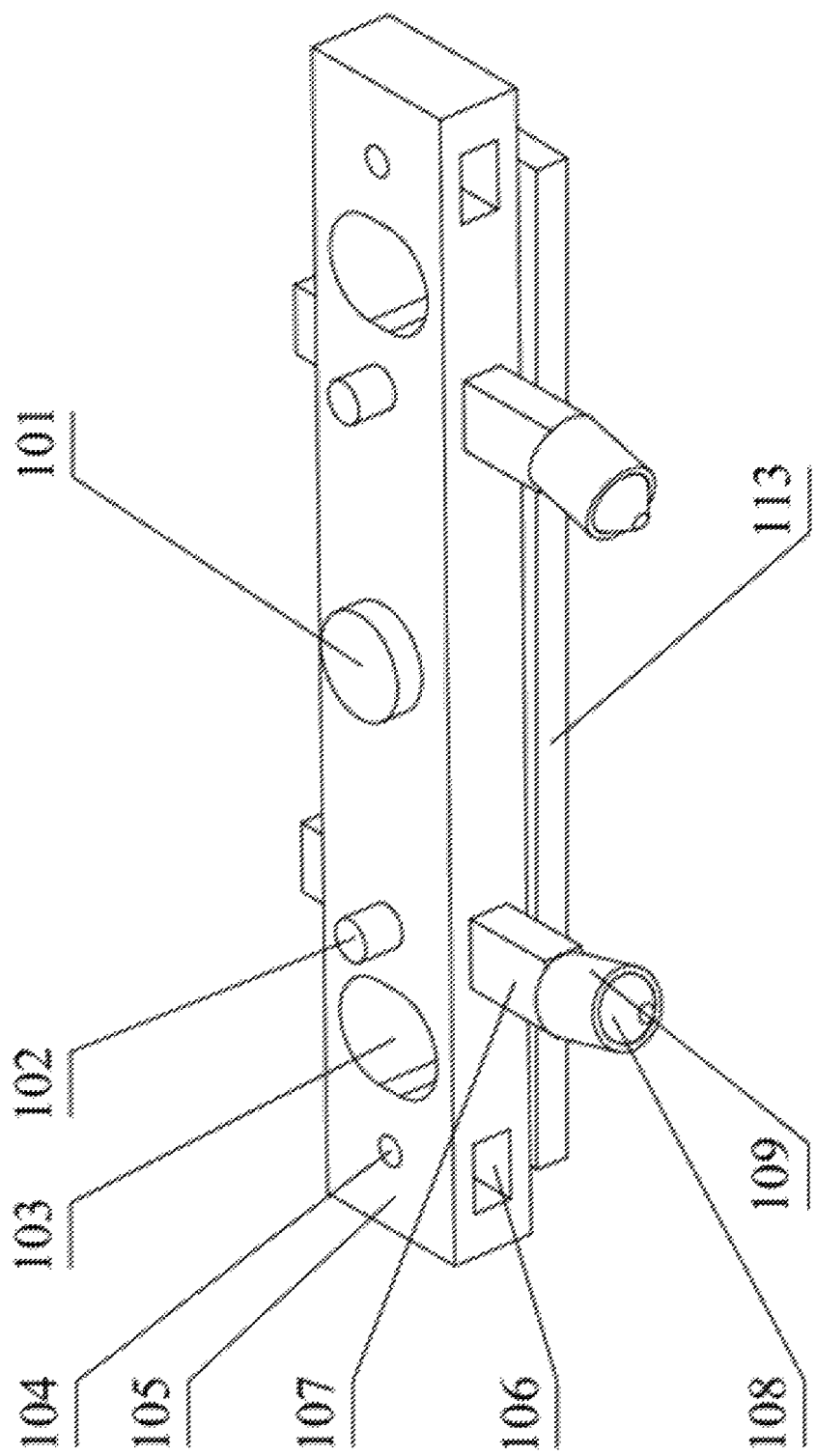
FIG. 2 is a three-dimensional section view of the present disclosure.

As shown in FIGS. 1 and 2, a self-adjusting robot clamping jaw for grabbing a hub includes connecting plates and clamping fingers installed symmetrically on two sides of the connecting plates; the connecting plates include an upper connecting plate 105 and a lower connecting plate 113, sections of which are both rectangular; a reset device is provided between the upper connecting plate 105 and the lower connecting plate 113, a pin hole 115 and a pin hole 111 are correspondingly provided in the middle parts of the upper connecting plate 105 and the lower connecting plate 113, a rotating pin 101 penetrates through the pin hole 115 and the pin hole 111, and a clamping ring 112 is arranged at the lower end of the rotating pin 101 to fit the upper connecting plate 105 and the lower connecting plate 113 together.

Strip through holes 103 are formed symmetrically on two sides of the upper plane of the upper connecting plate 105, and the lower connecting plate 113 is provided with mounting holes 114 corresponding to the strip through holes 103.

The clamping finger includes a clamping finger rod 107, a clamping finger stall 109 and a clamping finger head 108, the lower end of the clamping finger stall 109 is welded to the end of the clamping finger rod 107, the clamping finger head 108 is made of polyurethane and embedded into the clamping finger stall in an interference fit manner, two rectangular through holes 106 are provided symmetrically on the left and right sides of the front vertical face of the upper connecting plate 105, the clamping finger rods 107 are matched with the rectangular through holes 106 and inserted into the rectangular through holes at symmetrical positions, a pin hole 104 is formed above each rectangular through hole, all the clamping finger rods 107 are correspondingly provided with three pin holes 110, one of the pin holes 104 at the same part of the two clamping fingers is aligned with the pin hole 110 above the rectangular through hole of the upper connecting plate 105, and an additional positioning pin 102 is inserted into the aligned pin holes for fixing.

Figure 3:
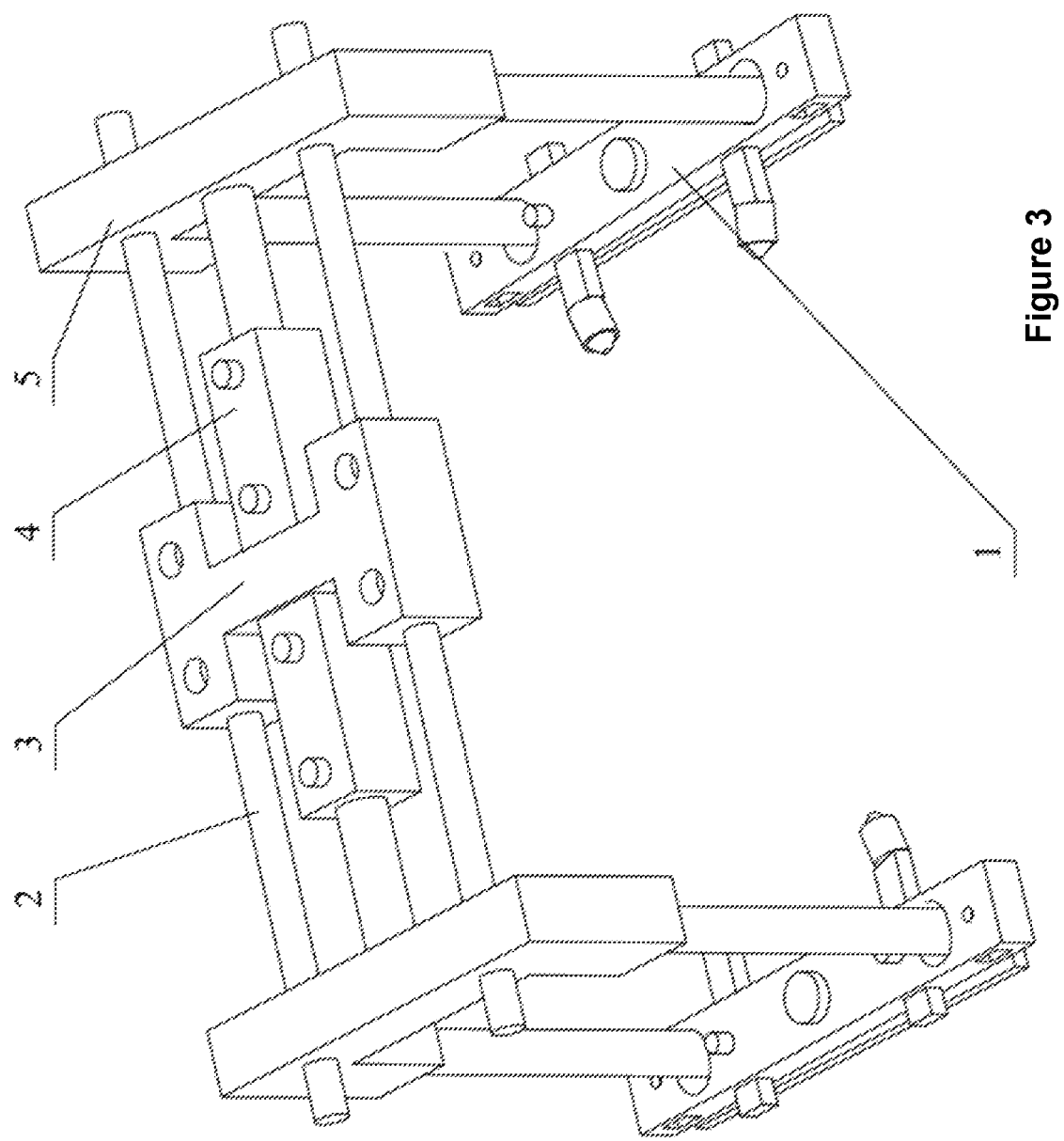
FIG. 3 is a three-dimensional schematic diagram indicating that the present disclosure is connected with a movable support.

As shown in FIGS. 1, 2 and 3, two supporting rods at the lower end of the clamping jaw movable support 5 penetrate through the strip through holes 103 of the upper connecting plate and are installed to the lower connecting plate 113, the upper end of the movable support 5 is connected with the end of a piston rod of a cylinder 4, the tail end of the cylinder body of the cylinder 4 is installed to a robot connecting seat 3, and sliding rods 2 are arranged on the robot connecting seat 3 and penetrate through sliding holes at the upper end of the movable support 5.

The invention claimed is:

1. A self-adjusting robot clamping jaw for grabbing a hub, comprising connecting plates and clamping fingers installed symmetrically on two sides of the connecting plates, is characterized in that the connecting plates comprise an upper connecting plate and a lower connecting plate, sections of which are both rectangular; pin holes are correspondingly provided in the middle parts of the upper and lower connecting plates, a rotating pin penetrates through the pin holes, and a clamping ring is arranged at the lower end of the rotating pin to fit the upper and lower connecting plates together; strip through holes are formed symmetrically on two sides of the upper plane of the upper connecting plate, the lower connecting plate is provided with mounting holes corresponding to the strip through holes, and the mounting holes are used to install the clamping jaw onto a clamping jaw movable support; the clamping finger comprises a clamping finger rod, a clamping finger stall and a clamping finger head, the lower end of the clamping finger stall is fixed to the end of the clamping finger rod, the clamping finger head is embedded into the clamping finger stall in an interference fit manner, and the clamping finger is installed onto the upper connecting plate via an adjustable device.

2. The self-adjusting robot clamping jaw for grabbing a hub of claim 1, wherein a reset device is provided between the upper and lower connecting plates.

3. The self-adjusting robot clamping jaw for grabbing a hub of claim 1, wherein the lower end of the clamping finger stall is welded to the end of the clamping finger rod.

4. The self-adjusting robot clamping jaw for grabbing a hub of claim 1, wherein the adjustable device between the clamping finger and the upper connecting plate is configured in such a manner that a plurality of rectangular through holes are provided symmetrically on the left and right sides of the front vertical face of the upper connecting plate, the clamping finger rods are matched with the rectangular through holes and inserted into the rectangular through holes at symmetrical positions, a pin hole is provided above each rectangular through hole, all the clamping finger rods are correspondingly provided with a plurality of pin holes, one of the pin holes at the same part of the two clamping fingers is aligned with the pin hole above the rectangular through hole of the upper connecting plate, and an additional positioning pin is inserted into the aligned pin holes for fixing.

5. The self-adjusting robot clamping jaw for grabbing a hub of claim 1, wherein the clamping finger heads are made of a soft material.

6. The self-adjusting robot clamping jaw for grabbing a hub of claim 5, wherein the clamping finger heads are made of polyurethane.

7. The self-adjusting robot clamping jaw for grabbing a hub of claim 1, wherein two supporting rods at the lower end of the clamping jaw movable support penetrate through the strip through holes of the upper connecting plate and are installed to the lower connecting plate, the upper end of the movable support is connected with the end of a piston rod of a cylinder, the tail end of the cylinder body of the cylinder is installed to a robot connecting seat, and sliding rods are arranged on the robot connecting seat and penetrate through sliding holes at the upper end of the movable support.

* * * * *